May 28, 1940.    W. L. KAUFFMAN, 2D    2,202,780
BEARING FOR WRINGERS AND THE LIKE
Filed March 17, 1937
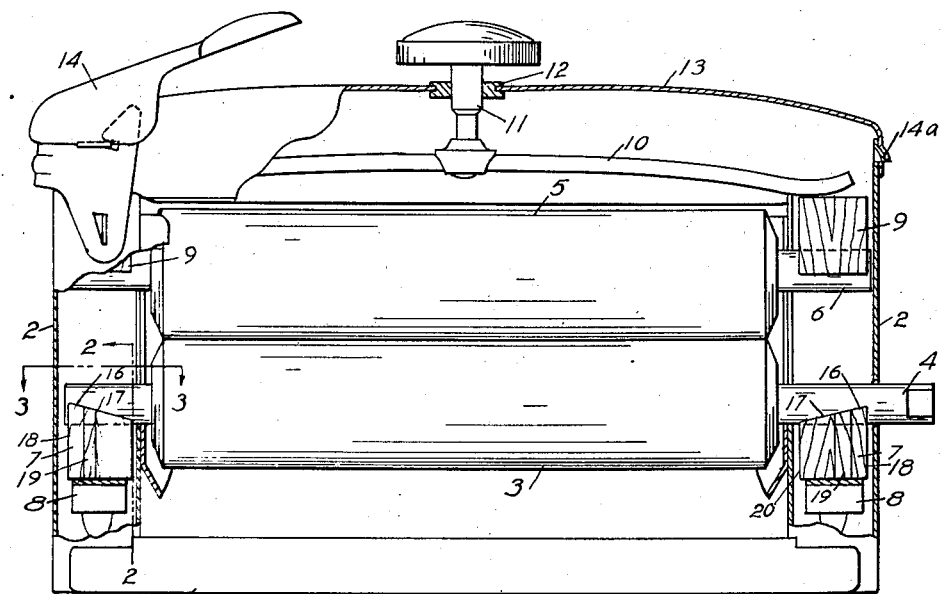
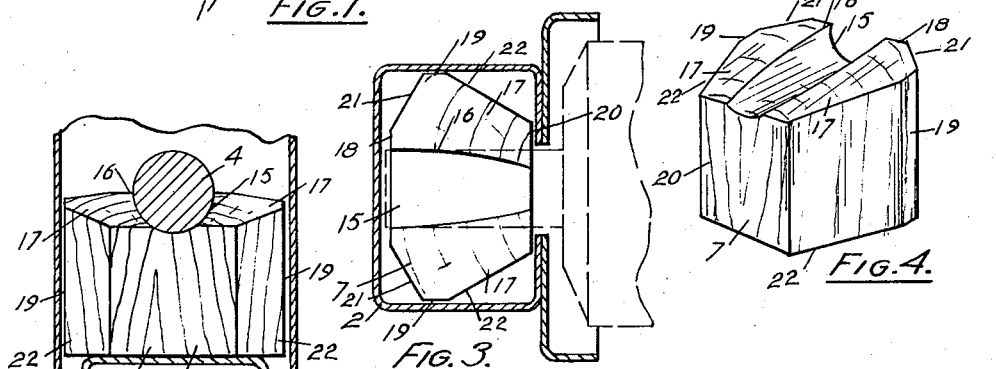
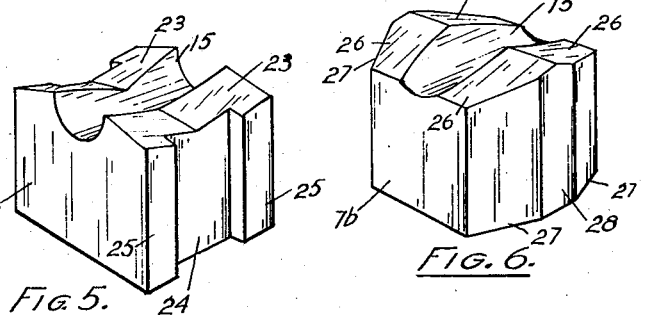
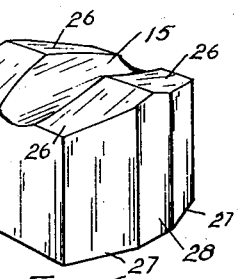
INVENTOR.
Walter L. Kauffman II
BY
ATTORNEYS.

Patented May 28, 1940

2,202,780

UNITED STATES PATENT OFFICE 2,202,780

BEARING FOR WRINGERS AND THE LIKE

Walter L. Kauffman, II, Erie, Pa., assignor to Lovell Manufacturing Company, Erie, Pa., a corporation of Pennsylvania Application March 17, 1937, Serial No. 131,341

9 Claims. (Cl. 68—269)

Wringers are usually supplied with bearings, and from the nature of their use the maintenance of a properly lubricated bearing has presented some difficulty. It has been common practice to form these bearings with a semi-cylindrical seat with slight, straight-sided extensions. The result of this was to provide a dirt receiving and retaining space immediately above the contacting side centers of the shaft.

In the present invention the bearing groove terminates at the center of the shaft so that there is close contact with the shaft and the top of the bearing block. The invention preferably involves also means for displacing any deposits on the top of the block that would be apt to be carried into the bearing surfaces and this is accomplished by inclining the top so that any deposits gradually work to the edge and drop off the top.

In the use of self-lubricating bearings in which the block is saturated with a lubricant, the retention of water in contact with the surfaces gradually dissipates the oil so as to impair the bearing. The inclined surfaces prevent the retention of moisture on the top of the bearing block and therefore the impairment of the bearing through the absorption of water is prevented.

The invention also contemplates, in a preferred form, extending this incline with its lower side next the inside of the wringer. When this is done, any water that is expelled from the rolls on the block is carried back to the inside of the stile and its entrance into the driving gear box is prevented.

The invention also contemplates forming the sides of the block so that there will be a comparatively small contact between the block surfaces and the side-walls of the stiles. This is desirable in that the moisture is retained by capillary action between these surfaces, and if these surfaces, sidewise at least, are reduced, the capillary action is reduced and thus the bearing is given a longer life. Features and details of the invention will appear from the specification and claims.

If the reduced contact surfaces are formed in narrow strips, one at each side of the block, the block can align with the shaft without binding and this shape also tends to avoid sticking of the block through shrinkage or warping. This is particularly true with relation to sliding blocks.

A preferred embodiment of the invention is illustrated in the accompanying drawing as follows:

Fig. 1 shows a front elevation of a wringer, partly in section, with bearings in place.

Fig. 2 an enlarged sectional view on the line 2—2 in Fig. 1.

Fig. 3 a similar view in section on the line 3—3 in Fig. 1.

Fig. 4 a perspective view of a preferred form of bearing block.

Fig. 5 a perspective view showing a modification.

Fig. 6 a perspective view of a further modification.

1 marks a wringer frame base, 2 the side stiles. These side stiles are of ordinary box form, rectangular in cross-section. The lower roll 3 is provided with a shaft 4. An upper roll 5 is provided with a shaft 6. Bearings 7 are provided for the lower shaft. These bearings are arranged within the stiles and mounted on brackets 8 in the stiles. Upper bearings 9 are slidingly mounted in the stiles. A spring 10 operates on the upper bearings and exerts the proper pressure on the rolls. An adjusting screw 11 operates in a fitting 12 carried by a top bar 13. The top bar is detachably mounted by interlocking shoulders 14a at one end, and a release device 14 of common construction at the opposite end. These parts, except for the bearing 7, are or may be of ordinary construction.

The bearing block 7 is provided with a bearing groove 15 receiving the shaft 4. The upper edges of the bearing groove at 16, as shown, do not extend at any point above the side centers of the shaft. In consequence there is no space above the contact surfaces for catching any material which might be detrimental to the contact bearing surfaces should such material be drawn into the bearing. The extension of this surface over the entire top of the block is preferable but it is effective to the extent used and particularly so if it extends over surfaces adjacent to the rolls. The upper surface 17 is inclined, the lower edge being preferably toward the inside. This inclination gradually works any deposit that may be on the upper surface of the block off the block and consequently prevents the entrance of such material into the bearing. The incline also tends to carry the water back toward the rolls and thus prevents in a large measure the flowing of the water into the gear case. In fact in this respect it has been proven more effective for this purpose than ordinary shaft seals. The surface preferably also is slightly inclined away from the groove 15 and this also tends to a movement of the material away from the operating surfaces.

The sides of the block have bearing surfaces 18, 19 and 20. These, as will be observed, are very much reduced by cutting the block at 21 and 22. These small surfaces do not retain the moisture as long as do the greater surfaces now in common use and consequently the bearings have a longer life. If these contact surfaces extend vertically and form a comparatively narrow strip, the reduction in surface is also desirable in that it allows the bearing to align itself with the shaft, and largely avoids any sticking in the stile through swelling or warpage.

The shedding of the water from the surfaces, particularly the upper surfaces of the block, prevents the displacement of the lubricant by water, such displacement preventing a replenishing of the bearing surfaces by the movement of oil through capillary action. When this happens, the bearings cease to be lubricated and their life is very much impaired, and the driving effort necessary to drive the wringer is increased.

In the modification shown in Fig. 5 the block 7a has bearing groove 15. The sides of this groove do not extend above the side centers of the shaft. The upper surfaces 23 of the block are inclined toward the center and the side faces of the block have grooves 24 providing a side contact surface 25. The grooves 24 may be utilized for a stop bail, not shown, but in any event, provide an outlet for the material discharged from the inclined surfaces. The surfaces are not only inclined toward the center but toward the sides.

In the modification shown in Fig. 6 the block 7b has the bearing groove 15. The top surfaces 26 are inclined from the center toward the inner and outer edges of the block. The block is cut away at 27 to reduce the contact surfaces at 28 of the sides.

What I claim as new is:

1. In a wringer, the combination with a frame and a wringer roll having a shaft, of a bearing block mounted in the frame having a bearing groove in its upper face receiving the shaft in bearing contact, the side walls of the groove terminating not higher than the axis of the shaft and the top surface of the block at both sides of the groove being inclined downwardly otherwise than toward the groove from the edges of the groove.

2. In a wringer, the combination with a frame and a wringer roll having a shaft, of a bearing block mounted in the frame having a bearing groove in its upper face receiving the shaft in bearing contact, the side walls of the groove terminating not higher than the axis of the shaft and the top surface of the block being inclined with the lower edge toward the wringer roll.

3. In a wringer, the combination with a frame having hollow stiles; and a wringer roll having a shaft, of a bearing block mounted in a stile with the faces of the block toward the front and rear of the wringer being adapted to contact the front and rear walls of the stile, said bearing block having a groove receiving a shaft in bearing contact, the front and rear faces of the block having cut away portions reducing the width of the surface adapted to contact, in the direction of the shaft, with the stile.

4. In a wringer, the combination with a frame having hollow stiles, and a wringer roll having a shaft, of a bearing block mounted in a stile, said bearing block having a groove in a face receiving the shaft in bearing contact, and having the face of the block toward the end of the wringer cut away reducing the width of the surface of the block on its said face adapted to contact with the wall of the stile.

5. In a wringer, the combination with a frame having hollow stiles, and a wringer roll having a shaft, of a bearing block mounted in a stile, said bearing block having a groove in its upper face receiving the shaft in bearing contact, the faces of the block toward the front and rear of the wringer being cut away to reduce the width of the surface of the block adapted to contact, in the direction of the shaft, with the stile, the top of the block being inclined to shed the material deposited thereon to spaces formed by the cut away portions.

6. In a wringer, the combination with a frame and a wringer roll having a shaft, of a bearing block in the frame having a bearing groove in its upper face receiving the shaft in bearing contact, the top of the block at both sides of the groove having surfaces inclined from the edges of the groove downwardly otherwise than toward the groove to deflect water from the shaft.

7. In a wringer, the combination with a frame and a wringer roll having a shaft, of a bearing block in the frame having a bearing groove in its upper face receiving the shaft in bearing contact, the top of the block at both sides of the groove having surfaces inclined from the edges of the groove downwardly toward the wringer roll and otherwise than toward the groove to deflect water from the shaft.

8. In a wringer, the combination with a frame and a wringer roll having a shaft, of a bearing block in the frame having a bearing groove in its upper face receiving the shaft in bearing contact, the top of the block having surfaces inclined from the edges at both sides of the groove and downwardly and outwardly to carry water from the shaft.

9. In a wringer, the combination with a frame and a wringer roll having a shaft, of a bearing block in the frame having a bearing groove in its upper face receiving the shaft in bearing contact, the top of the block having surfaces inclined from the edges at both sides of the groove downwardly, outwardly and lengthwise to carry water from the shaft.

WALTER L. KAUFFMAN, II.